(12) United States Patent
Burle et al.

(10) Patent No.: US 11,637,861 B2
(45) Date of Patent: Apr. 25, 2023

(54) REACHABILITY GRAPH-BASED SAFE REMEDIATIONS FOR SECURITY OF ON-PREMISE AND CLOUD COMPUTING ENVIRONMENTS

(71) Applicant: BMC Software, Inc., Houston, TX (US)

(72) Inventors: Siddharth Sukumar Burle, Pune (IN); Ajoy Kumar, Santa Clara, CA (US); Manish Jain, Haryana (IN)

(73) Assignee: BMC Software, Inc., Houston, TX (US)

( * ) Notice: Subject to any disclaimer, the term of this patent is extended or adjusted under 35 U.S.C. 154(b) by 460 days.

(21) Appl. No.: 16/750,323

(22) Filed: Jan. 23, 2020

(65) Prior Publication Data

US 2021/0234889 A1 Jul. 29, 2021

(51) Int. Cl.
*H04L 9/40* (2022.01)
*G06N 20/20* (2019.01)

(52) U.S. Cl.
CPC ......... *H04L 63/1458* (2013.01); *G06N 20/20* (2019.01); *H04L 63/1425* (2013.01); *H04L 63/1433* (2013.01); *H04L 63/20* (2013.01)

(58) Field of Classification Search
CPC ............. H04L 63/1458; H04L 63/1425; H04L 63/1433; H04L 63/20; G06N 20/20
See application file for complete search history.

(56) References Cited

U.S. PATENT DOCUMENTS

| | | | | |
|---|---|---|---|---|
| 9,092,616 B2 * | 7/2015 | Kumar | .................. | G06F 21/51 |
| 10,944,758 B1 * | 3/2021 | Nagargadde | ........ | G06F 21/6218 |
| 10,958,662 B1 * | 3/2021 | Sole | .................... | H04L 63/0853 |
| 11,016,852 B1 * | 5/2021 | Viswanathan | ...... | G06F 11/1417 |
| 11,030,318 B1 * | 6/2021 | Shavro | .................. | G06F 21/577 |
| 2011/0126275 A1 * | 5/2011 | Anderson | ........... | H04L 63/0807 726/8 |
| 2015/0326586 A1 * | 11/2015 | Khesin | .................. | G06F 21/568 726/1 |
| 2015/0355895 A1 * | 12/2015 | Giammaria | ......... | G06F 11/3688 717/169 |
| 2016/0019534 A1 * | 1/2016 | Sidhu | .................... | G06Q 20/38 705/39 |

(Continued)

OTHER PUBLICATIONS

Extended European Search Report for European Application No. 21153118.1, dated Jun. 21, 2021, 9 pages.

*Primary Examiner* — Joseph P Hirl
*Assistant Examiner* — Stephen T Gundry
(74) *Attorney, Agent, or Firm* — Brake Hughes Bellermann LLP

(57) ABSTRACT

A method for securing a networked computer system executing an application includes identifying a vulnerable computer resource in the networked computer system, determining all computer resources in the networked computer system that are accessible from, or are accessed by, the vulnerable computer resource, and prioritizing implementation of a remediation action to secure the vulnerable computer resource if a vulnerability path extends from the vulnerable computer resource to a critical computer resource that contains sensitive information. The remediation action to secure the vulnerable computer resource is a safe remediation action that does not impact availability of the application executing on the networked computer system.

24 Claims, 14 Drawing Sheets

(56) References Cited

U.S. PATENT DOCUMENTS

| | | | | |
|---|---|---|---|---|
| 2017/0324756 A1* | 11/2017 | Adams | ......... | G06F 21/568 |
| 2018/0375887 A1* | 12/2018 | Dezent | ......... | H04L 41/142 |
| 2020/0021609 A1* | 1/2020 | Kuppanna | ......... | H04L 63/0227 |
| 2021/0021629 A1* | 1/2021 | Dani | ......... | H04L 63/1433 |
| 2021/0037038 A1* | 2/2021 | Alsharif | ......... | G06F 21/577 |
| 2021/0099478 A1* | 4/2021 | Seetharamaiah | ......... | H04L 63/14 |
| 2021/0126949 A1* | 4/2021 | Nadgowda | ......... | H04L 63/1433 |
| 2021/0152590 A1* | 5/2021 | Urias | ......... | H04L 63/1425 |
| 2021/0168150 A1* | 6/2021 | Ross | ......... | G06F 16/9024 |
| 2021/0218759 A1* | 7/2021 | Ahmed | ......... | G06F 11/0793 |
| 2021/0234860 A1* | 7/2021 | Bansal | ......... | H04W 12/37 |
| 2021/0258329 A1* | 8/2021 | Clayton | ......... | H04L 9/3239 |
| 2021/0321259 A1* | 10/2021 | Louafi | ......... | G06K 9/6223 |

* cited by examiner

Resource_to_resource - #ofcalls MATRIX 501

| | Resource 1 | Resource 2 | Resource 3 | ... |
|---|---|---|---|---|
| Resource 1 | x | y | x | ... |
| Resource 2 | x | x | x | ... |
| ... | y | y | x | ... |

Resource_to_IP - #ofcalls MATRIX 502

| | IP 1 | IP 2 | IP 3 | ... |
|---|---|---|---|---|
| Resource 1 | x | x | y | ... |
| Resource 2 | y | x | x | ... |
| ... | y | y | y | ... |

Resource_to_API - #ofcalls MATRIX 503

| | API 1 | API 2 | API 3 | ... |
|---|---|---|---|---|
| Resource 1 | x | x | x | ... |
| Resource 2 | y | x | x | ... |
| ... | y | y | x | ... |

FIG. 7

Resource_to_resource.ssltrue MATRIX 901

| Resource | Resource-239 | Webserver-5 | Web-1 | IP-2 |
|---|---|---|---|---|
| DB1 | y | y | y | y |
| DB2 | n | y | y | y |
| ... | | | | |

FIG. 9

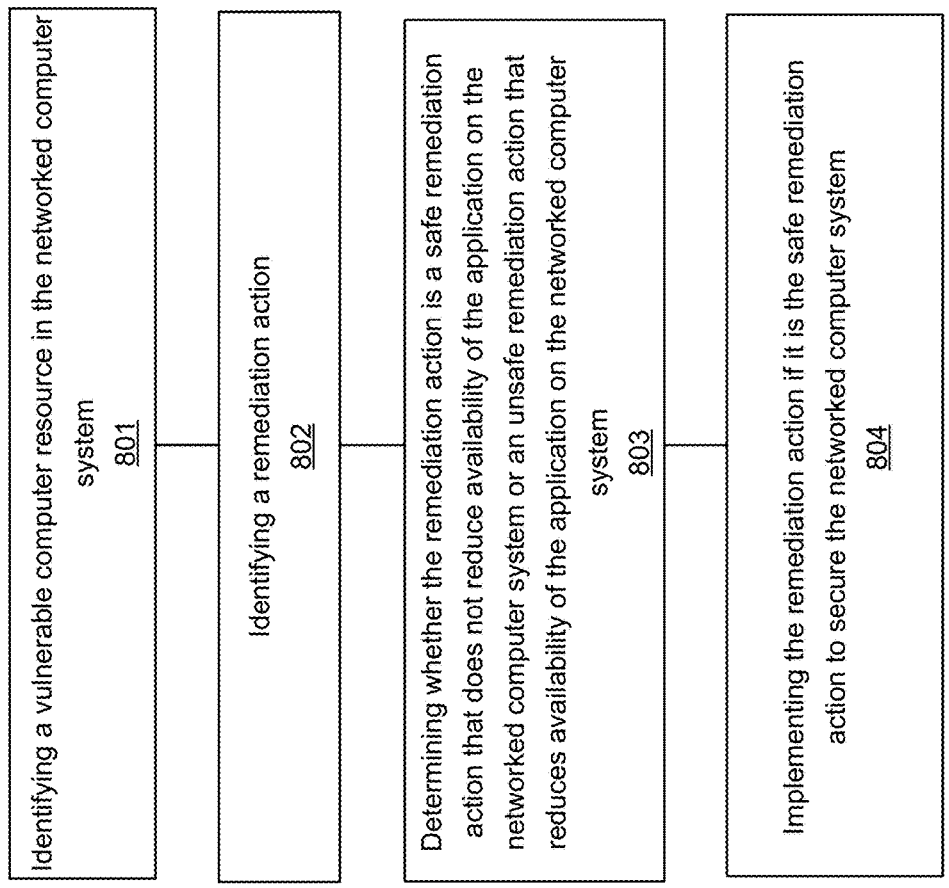

REACHABILITY GRAPH-BASED SAFE REMEDIATIONS FOR SECURITY OF ON-PREMISE AND CLOUD COMPUTING ENVIRONMENTS

This disclosure relates to securing networked computer systems and computer resources that support cloud or on-premise computing platforms against unauthorized third-party penetration.

BACKGROUND

A computer security "vulnerability" may be a weakness, exposure, or gap in a computer system that can be exploited, for example, by unauthorized third parties to gain access to private data on the computer system. An attack surface of the computer system is the sum of the different points of vulnerability through which an unauthorized third party can penetrate and harm the system, for example, by entering data into or extracting data from the computer system.

Establishing good computer security (which may include processes and mechanisms by which equipment, information, and services are protected from unauthorized access, changes, or destruction) is essential for secure operation of the computer system whether in a cloud or an on-premise environment.

The security of on-premise and cloud environments is the protection of data, applications on and infrastructures of on-premise and cloud computing platforms. An aspect of security involves receiving alerts of potential security threats. Another aspect of security involves fixing or remediating the underlying conditions giving rise to the potential security threats. The remediation process can be conducted, for example, by a security and operations (SecOps) team. However, in the context of modern computing networks, including extensive cloud computing networks, there can be too many alerts that provide too little context making it hard for SecOps teams to prioritize and resolve security threats in a timely manner.

In networked computer systems, the term "blast radius" is used to define the extent or reach of a faulty configuration or problem at a computer resource. For example, if a change is made incorrectly to a firewall or router that prevents it from passing traffic, the extent or reach of the disruption to other computer resources in the networked computer system is known as the blast radius.

SUMMARY

Methods and systems for securing a networked computer system hosting an application are disclosed herein.

In a general aspect, a method for securing the networked computer system hosting an application includes identifying a vulnerable computer resource in the networked computer system and identifying a remediation action. The method further includes determining whether the remediation action is an unsafe remediation action that reduces availability of the application on the networked computer system or is a safe remediation action that does not reduce availability of the application on the networked computer system is, and implementing the remediation action to secure the networked computer system if it is the safe remediation action.

In a general aspect, a method for securing the networked computer system hosting an application includes monitoring a behavior of computer resources in the networked computer system over a period of time, and generating behavioral models of the computer resources. The method further includes using the behavioral models as training data for machine learning to learn a safe remediation action that does not impact application availability on the networked computer system. The machine learning learns from the behavioral models of the particular computer resources in the networked computer system that are affected by the safe remediation action. The machine learning learns what access controls or modifications to the particular computer resources are implemented by the safe remediation action.

In a general aspect, a system for securing a networked computer system includes a computing device including at least one processor and at least one memory, a scanner identifying a vulnerable computer resource in the networked computer system, and a remediation actions selector identifying a remediation action. The system further includes an application availability analyzer determining whether the remediation action is a safe remediation action that does not reduce availability of the application on the networked computer system or an unsafe remediation action that reduces availability of the application on the networked computer system, and a remediations implementer implementing the remediation action if it is the safe remediation action to secure the networked computer system.

In a general aspect, a system for securing a networked computer system further includes a reachability graph analyzer determining all the computer resources in the networked computer system that are accessible from, or are accessed by, the vulnerable computer resource, and a vulnerable paths determiner determining whether a path extends from the vulnerable computer resource to a critical computer resource that contains sensitive information. The computer system can also include a remediation implementer prioritizing implementation of a remediation action to secure the computer resource when a vulnerability path extends from a vulnerable computer resource to the critical computer resource.

The details of one or more implementations are set forth in the accompanying drawings and the description below. Other features will be apparent from the description and drawings, and from the claims.

BRIEF DESCRIPTION OF THE DRAWINGS

FIG. 7 illustrates example behavioral models for behavioral metrics of computer resources in the networked computer system of FIG. 1B, in accordance with the principles of the present disclosure.

FIG. 9 illustrates an example behavioral model based on monitoring traffic flows between two databases and other computer resources in a networked computer system, in accordance with the principles of the present disclosure.

FIG. 11 is an illustration of an example method for securing a networked computer system, in accordance with the principles of the present disclosure.

Throughout the figures, unless otherwise stated, the same reference numerals and characters are used to denote like features, elements, components, or portions of the illustrated embodiments.

DETAILED DESCRIPTION

Figure 1A:
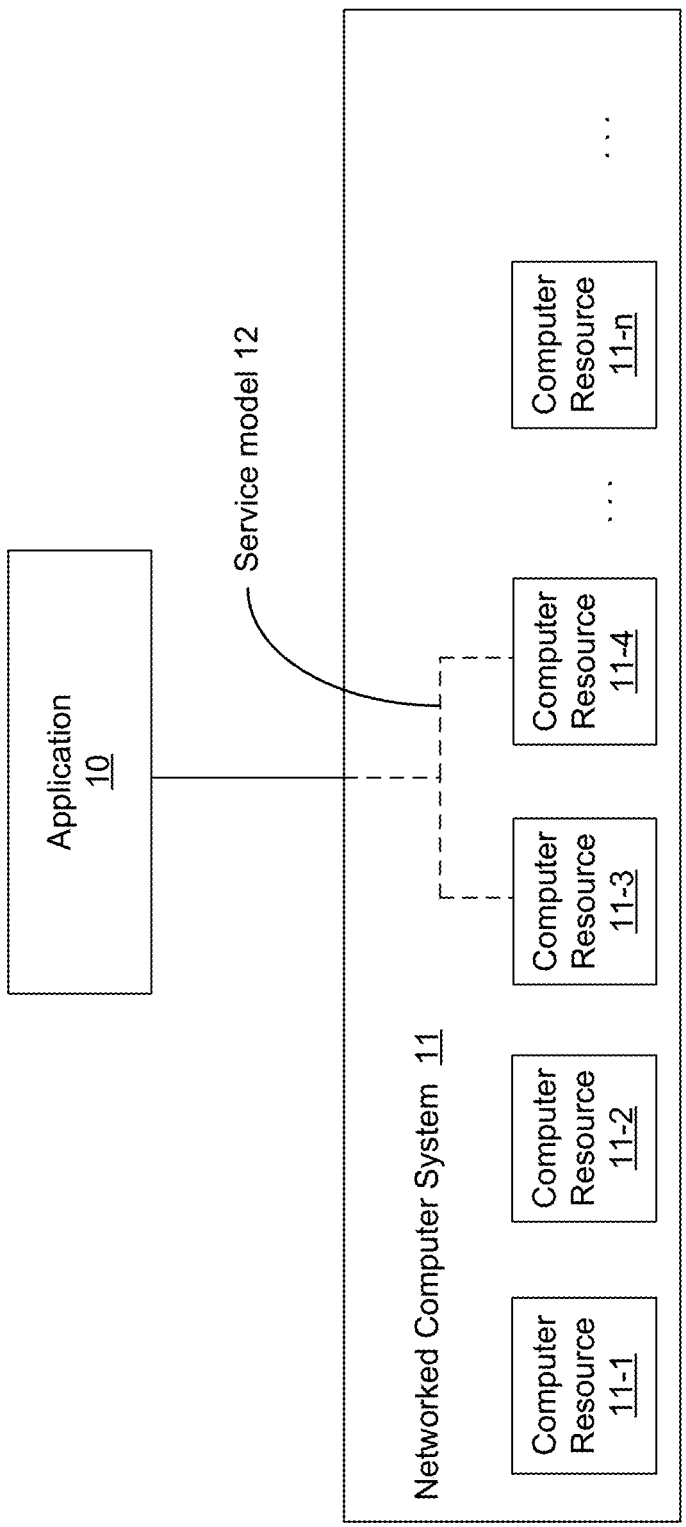
FIG. 1A is a schematic illustration of an application executing on a networked computer system.

A networked computer system (e.g., a public cloud, a private cloud, or an on-premise system) can provide a platform for executing one or more applications. The networked computer system may include a variety of hardware, software, and firmware components ("computer resources") used to support execution of the applications. FIG. 1A is a schematic illustration of an application 10 hosted on a networked computer system 11. Networked computer system 11 may, for example, include a plurality of computer resources (e.g., computer resources 11-1, 11-2, 11-3, 11-4, . . . , 11-n, etc.) including, for example, one or more servers (e.g., web servers, application servers, etc.), databases, software code, network components, and other applications and services. In example cloud implementations of networked computer system 11, the plurality of computer resources can include thousands of servers and interconnected cloud resources.

Application 10 may, for example, be a web-based retail transaction application, a printing service application, etc. A service model 12 may represent the particular computer resources (e.g., particular computer resources 11-3 and 11-4) in the networked computer system that support execution of the application and the relationships between the particular computer resources.

Application availability is the extent to which an application is operational, functional and usable for completing or fulfilling a user's or business's requirements. Typically, application availability is measured through application-specific key performance indicators (KPIs). These can include, for example, the overall or timed application uptime and downtime, the number of transactions completed, application responsiveness, errors, and other availability-related metrics. Application availability is affected by the state or condition of the computer resources used to support execution of the application on the networked computer system.

To keep applications (e.g., application 10) executing on a networked computer system (e.g., system 11) secure from attacks by an unauthorized third party, it is important to detect security vulnerabilities (real or potential) in the networked computer system (including the networked computer system infrastructure) and to promptly remediate the security vulnerabilities. A remediation action may, for example, involve closing access, or modifying access permissions, to one or more of the computer resources in the networked computer system. Other remediation actions may, for example, involve closing or modifying ports, updating configurations of one or more of the computer resources, etc. The detected security vulnerabilities in the networked computer system may be vulnerabilities in computer resources that are within the application's service model (e.g., in service model 12, particular computer resources 11-3 and 11-4) or in computer resources that are outside the service model (e.g., computer resources 11-1, 11-2, etc.). Both types of computer resource vulnerabilities (i.e., within or outside the service model) and corresponding remediations can affect application availability on the networked computer system.

Many automated vulnerability detection and reporting systems (e.g., the BMC Helix® Cloud Security solution, the BMC® Automated Mainframe Intelligence™ (BMC AMI®) solutions, as well as the Oracle® Cloud Security, Palo Alto Network security, and CloudGuard Dome 9 public cloud security solutions, etc.) that can automatically scan, detect, and report security vulnerabilities (e.g., an open Amazon Simple Storage Service (S3) bucket or an open firewall port) in computer systems, are now commercially available. The security vulnerabilities may be a result, for example, of misconfigurations, or weaknesses in the configuration, of computer resources that are connected by the networked computer system. While the detection and reporting using the automated vulnerability detection and reporting systems can be quick, traditional remediation processes, such as those implemented by SecOps, for cloud security vulnerabilities in dynamic cloud computing environments are likely to be slow and incomplete.

The traditional remediation processes can be slow at least because of the long lead times involved in deciding and implementing proper remediation actions. Even when a remediation fix (e.g., a point fix such as an ingress rule change on an open firewall port) for a security vulnerability is available, the remediation fix's blast radius in the computing network is generally not known to SecOps. In other words, the extended effect of the remediation fix (i.e., the point fix) on applications executing on the networked computer system is not known to SecOps. SecOps operators may be reluctant to implement the remediation fix without knowledge of its impact on applications executing on the networked computer system and on the applications' availabilities on the networked computer system. The SecOps operators may spend considerable time in discussions with application teams to determine the impact of the remediation fix on application availability before implementing the fix. In other words, lack of knowledge of the remediation fix's blast radius and lack of knowledge of the remediation fix's impact on application availability slows down implementation of the remediation fix by SecOps.

The term "safe" remediation is used herein to refer to a remediation that has little or no impact on application availability in a networked computer system. In other words, a safe remediation of a vulnerable computer resource in the networked computer system should not bring down or otherwise hinder an application executing on the networked computer system.

The disclosure herein provides systems and methods (collectively "solutions") for securing a networked computer system. The solutions involve determination of, and use of, safe remediations to address security vulnerabilities in the networked computer system, in accordance with the principles of the present disclosure. Further, the disclosed solutions utilize the safe remediations not merely to address individual points of security vulnerabilities in the networked computer system, but to also provide a multi-layered defense based on a defense-in-depth security architecture of the networked computer system. The defense-in-depth security architecture may be based on security controls (e.g., access controls) that are designed to protect the physical, technical, and administrative aspects of the networked computer system. In the defense-in-depth security architecture, an initial point of security vulnerability may be characterized as being in a first layer of the networked computer system having its computer resources organized in multiple layers (the first layer to the nth layer). The multi-layered defense may involve placing security controls in higher layers (e.g., the second layer, the third layer, etc.) of the networked computer system in consideration of the possible multiple attack paths that may be used to exploit the security vulnerability (e.g., in a complex cloud environment). Defending an application with multiple layers of security controls can prevent a single point of failure or vulnerability from compromising the security of the application, for example, in a complex cloud environment.

The solutions for securing the networked computer system involve defining a blast radius of a reported security vulnerability (or a corresponding remediation) by automatically performing a graph-based reachability analysis. The graph-based reachability analysis can determine accessible paths (e.g., internet or network paths) over which the security vulnerability can propagate from an attack surface (i.e., a publicly exposed (e.g., an internet-exposed) vulnerable computer resource) to other computer resources (such as a database, a storage bucket, or a server) in the networked computer system. The accessible paths can be determined based on access rights from the publicly exposed vulnerable resource and not based on traditional service or topology models. The blast radius may be defined based on identification of the paths in the networked computer system that must be traversed from the reported security vulnerability to access other computer resources (which may hold critical or sensitive information). This definition of the blast radius may allow prioritization of remediation efforts (e.g., by SecOps) by focusing remediation on protection of critical computer resources and data that may be within the blast radius. The graph-based reachability analysis, used by the solutions herein to define the blast radius, provides a more accurate measure of blast radius than service model or topology-based traversals.

Further, the solutions for securing the networked computer system involve monitoring networked computer system behavior along the vulnerability traversal paths to help determine safe remediations that will not impact application availability. Since the safe remediations are designed to preserve application availability, the safe remediations can be applied immediately (e.g., by SecOps operators) without the application team's involvement. An application will not go down or break if a safe remediation is implemented by the SecOps operators.

The networked computer system may have its linked computer resources arranged in layers of the network. The solutions for securing the networked computer system may include applying the remediations to multiple layers of the computer resources to ensure defense-in-depth security remediation of the networked computer system. For example, a first layer and a second layer of safe remediations may be derived from the graph-based reachability analysis of traversal paths of a vulnerability from the attack surface to other computer resources and applied to the first layer and the second layer of computer resources to ensure defense-in-depth security remediation.

Figure 1B:
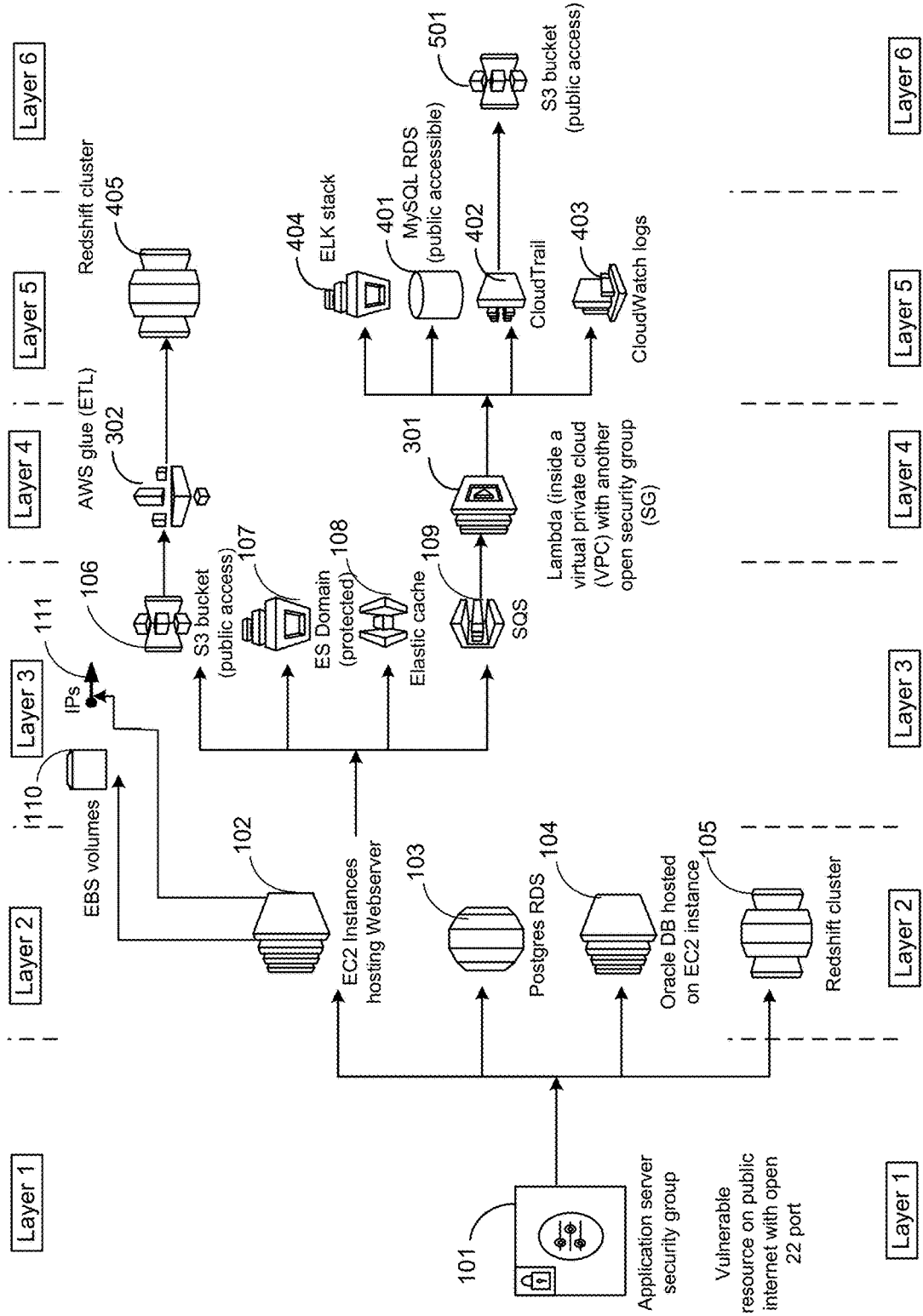
FIG. 1B is a schematic illustration of a networked computer system having security vulnerabilities.

FIG. 1B is a schematic illustration of a networked computer system 100 that may be secured by the foregoing solutions, in accordance with the principles of the present disclosure. Networked computer system 100, which may be a cloud-based computer system, may include a plurality of linked computer resources (e.g., application server security group 101, virtual servers (e.g., EC2 Instances) 102, relational databases (e.g., PostGres RDS) 103, third-party database (e.g., Oracle DB) 104, data warehouse (e.g., Redshift cluster) 105, object storage service (e.g., S3 bucket) 106, protected ES Domain 107, Elastic cache 108, messaging queue service (e.g., SQS) 109, EBS volumes 110, elastic Internet Protocol (IP) addresses (e.g., IPs) 111, Lambda function 301, AWS glue 302, MySQL RDS 401, CloudTrail 402, CloudWatch logs 403, Elk stack 404, Redshift cluster 405, and S3 bucket 501, etc.). The plurality of linked computer resources may be arranged in a plurality of layers (e.g., layer 1, layer 2, . . . , layer 6, etc.). Computer resources in any one layer (e.g., layer 1) are directly linked or attached to resources in the next higher layer (e.g., layer 2), and indirectly linked to resources in higher layers (e.g., layer 3, layer 4, etc.).

As shown in FIG. 1B, layer 1 of networked computer system 100 may, for example, include an application server security group 101 that can provide narrow access or broad access via the public internet to applications (launched, for example, from application servers (not shown)) to other computer resources (sites) in computer system 100.

In example implementations, the other computer resources of networked computer system 100 may include one or more virtual servers 102 that can run applications in a cloud computing environment. Virtual servers 102 may be instances of a webserver hosted on, for example, Amazon's Elastic Compute Cloud (EC2) for running applications on an Amazon Web Services (AWS) infrastructure.

Further, the other computer resources (e.g., in layer 2) may, for example, include one or more relational databases 103 (e.g., an open source PostgreSQL relational database), a third-party database 104 (e.g., an Oracle database) hosted on a virtual server instance of EC2, and a data warehouse 105 (e.g., an Amazon Redshift cluster). One or more instances of virtual servers 102 may host objects (e.g., in layer 3) such as an object storage service 106 (e.g., an Amazon Simple Storage Service (S3) bucket), a protected ES Domain 107, an Elastic cache 108, and a messaging queue service 109 (e.g., an Amazon SQS Queue URL), etc.

Further, one or more durable block storage devices (e.g., EBS volumes 110) (in layer 3) may be attached to each instance of virtual servers 102. Virtual servers 102 may be addressed by elastic Internet Protocol (IP) addresses (elastic IPs) 111 (in layer 3), which may be, for example, static, public IPv4 addresses designed for dynamic cloud computing.

One or more of the computer resources in networked computer system 100 may be critical computer resources that may, for example, store sensitive business data or personally identifiable information (PII). The critical computer resources may, for example, include one or more relational databases 103 (e.g., an open source Postgres RDS relational database), third-party database 104 (e.g., an Oracle database), data warehouse 105 (e.g., an Amazon Redshift cluster), object storage service 106 (e.g., an Amazon Simple Storage Service (S3) bucket), and elastic cache 108. These critical computer resources must be protected at all cost as any breach by an attacker via a vulnerable computer resource (such as application server security group 101) can have a large financial or business impact (e.g., for a customer). The critical computer resources may be resources that have been previously identified (e.g., by the customer, or by administrators) as being critical computer resources in the networked computer system. By providing multi-layered remediation, the solutions described herein, are likely to protect the critical computer resources from breach via the vulnerable traversal paths (e.g., Internet paths) from an attack surface.

In the example shown in FIG. 1B, application server security group 101 may be a computer resource having a security vulnerability. The security vulnerability of application server security group 101 may arise, for example, from an "open port 22" condition on its communications interface. Further, in the example shown in FIG. 1B, object storage service 106 (e.g., an Amazon Simple Storage Service (S3) bucket) may be a computer resource having a security vulnerability because of the public access to the resource. Traditional remediation actions (e.g., "close port 22", and "remove public access from S3") would secure the two computer resources (i.e., application server security group 101 and object storage service 106). However, these traditional remediation actions would also cause an application launched from application server security group 101 to become unavailable or to stop working because the S3 bucket will become inaccessible to the application and because port 22 for launching the application will be closed.

In contrast to the traditional remediation actions, the solutions for securing the networked computer system described in the present disclosure determine and use safe remediations that will not impact application availability.

In example implementations, the safe remediations may be discovered or developed by applying artificial intelligence (AI) and machine learning techniques to behavioral models of the computer resources in the networked computer system. The behavioral models may be based on monitored behaviors of the computer resources over an extended time period (e.g., a few weeks). The AI and machine learning techniques may be applied to convert or develop a traditional remediation that is unsafe into a safe remediation for the networked computer system. The machine learning techniques may, for example, learn from the behavioral models which particular computer resources in the networked computer system are affected by the safe remediation action and learn what access controls or modifications to the particular computer resources are implemented by the safe remediation action.

Figure 2A:
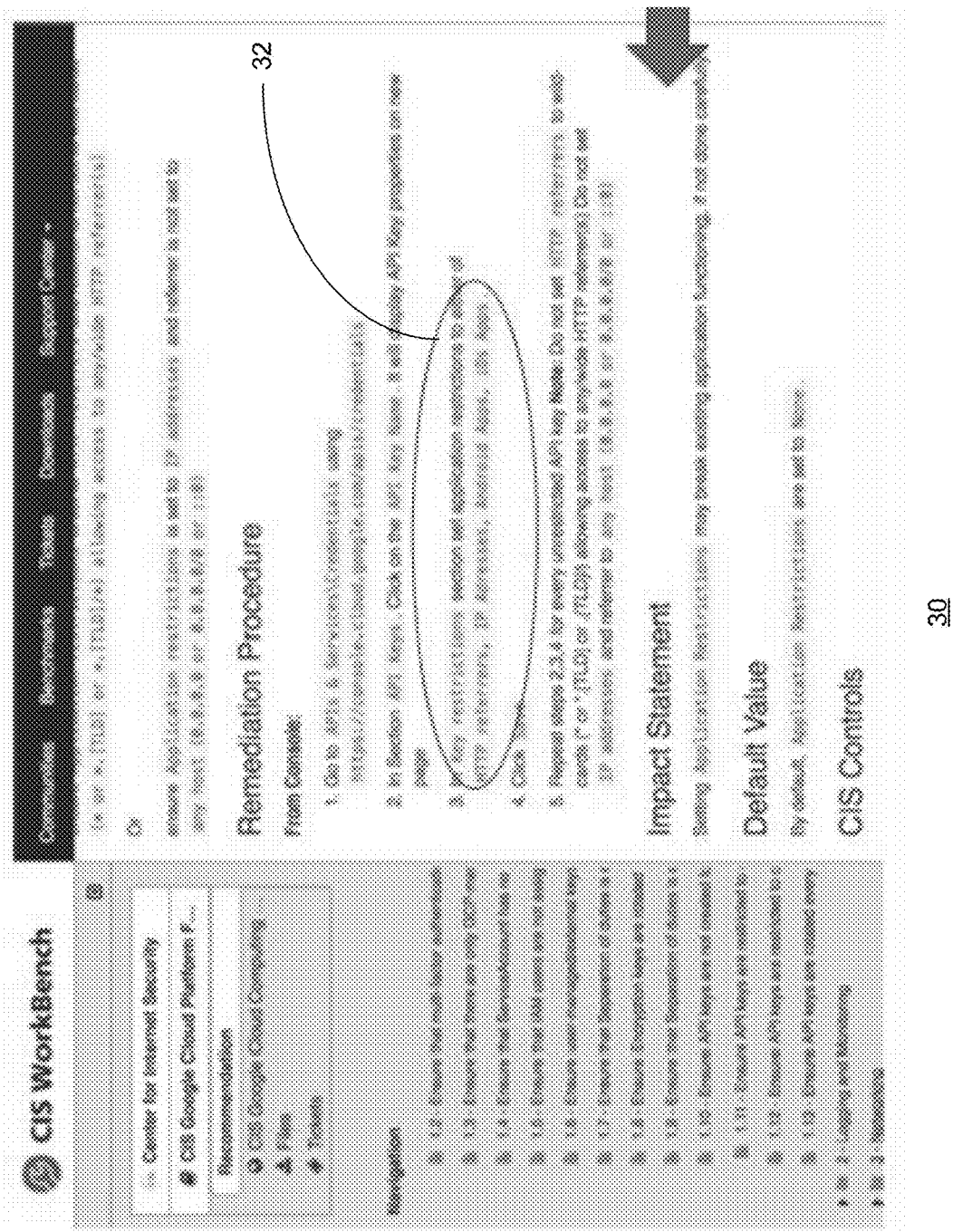
FIG. 2A is a screenshot of an example traditional remediation procedure.

For example, FIG. 2A shows a screenshot of an example traditional remediation procedure 30 that is publicly available from industry standards organizations such as the CIS (Center for Internet Security, Inc., East Greenbush, N.Y.) (CIS). Remediation procedure 30, which relates to Internet security, includes a remediation action 32:

In key restrictions section set application restrictions to either of HTTP referrers, IP addresses, Android Apps, iOs Apps.

Remediation action 32 provides an option of setting application restrictions to one of four entities (i.e., (1) HTTP referrers, (2) IP addresses, (3) Android Apps, or (4) iOs Apps ("Entities")).

Figure 2B:
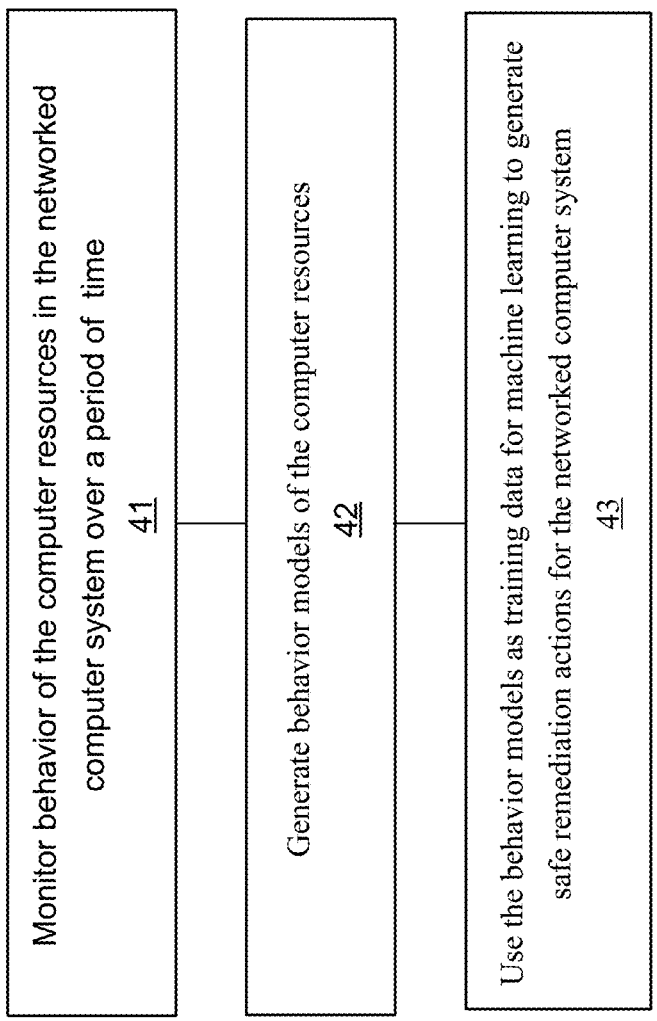
FIG. 2B is an illustration of an example method for generating safe remediation actions, in accordance with the principles of the present disclosure.

Remediation action 32 may or may not be a safe remediation action that will not have adverse impact on application functioning in the context of networked computer system 100. However, remediation action 32 can be converted into (or confirmed to be) a safe remediation using AI and machine learning techniques. FIG. 2B schematically shows a method 40 for generating safe remediation actions using AI and machine learning techniques. Method 40 includes monitoring behaviors of the computer resources in the networked computer system over a period of time (41) and generating behavioral models of the computer resources (42). In example implementations, the monitored behaviors of a computer resource may, for example, include behaviors that describe: a configuration history of the computer resource; the entities that access the computer resource; the APIs used; the applications that talk to the computer resource; and the IP addresses that the computer resource talks to, etc. The period of time over which the behaviors of the computer resource are monitored may, for example, be a few weeks (e.g., one to two weeks). The behavioral models of the computer resources may be collections of the monitored behavioral data. An example behavioral model for a key computer resource may involve monitoring key usage scenarios, for example, over the past two weeks, and "learning" a list of Entities (e.g., HTTP referrers or iOs apps) that this key computer resource uses in normal behavior.

Method 40 further includes using the behavioral models as training data for machine learning to generate safe remediation actions for networked computer system 100 (43). Machine learning may be used to learn, for example, how access to different computer resources in networked computer system can be controlled to secure the vulnerability with little or no interference with application functioning.

For example, a known remediation action (e.g., remediation action 32, FIG. 2A) may be:

In key restrictions section set application restrictions to either of HTTP referrers, IP addresses, Android Apps, iOs Apps.

Remediation action 32 permits setting application restrictions to one of four Entities (i.e., (1) HTTP referrers, (2) IP addresses, (3) Android Apps, or (4) iOs Apps). Remediation action 32 may be used as a seed or starting remediation action that is converted into a safe remediation action by machine learning. Remediation action 32 may be converted into a safe remediation action 52, for example, by limiting permission to set application restrictions on some of the Entities (e.g., HTTP referrers and iOs apps) that are specified by the behavioral models. The behavioral models may, limit application restrictions on two Entities, for example, IP addresses and Android Apps.

Figure 2C:
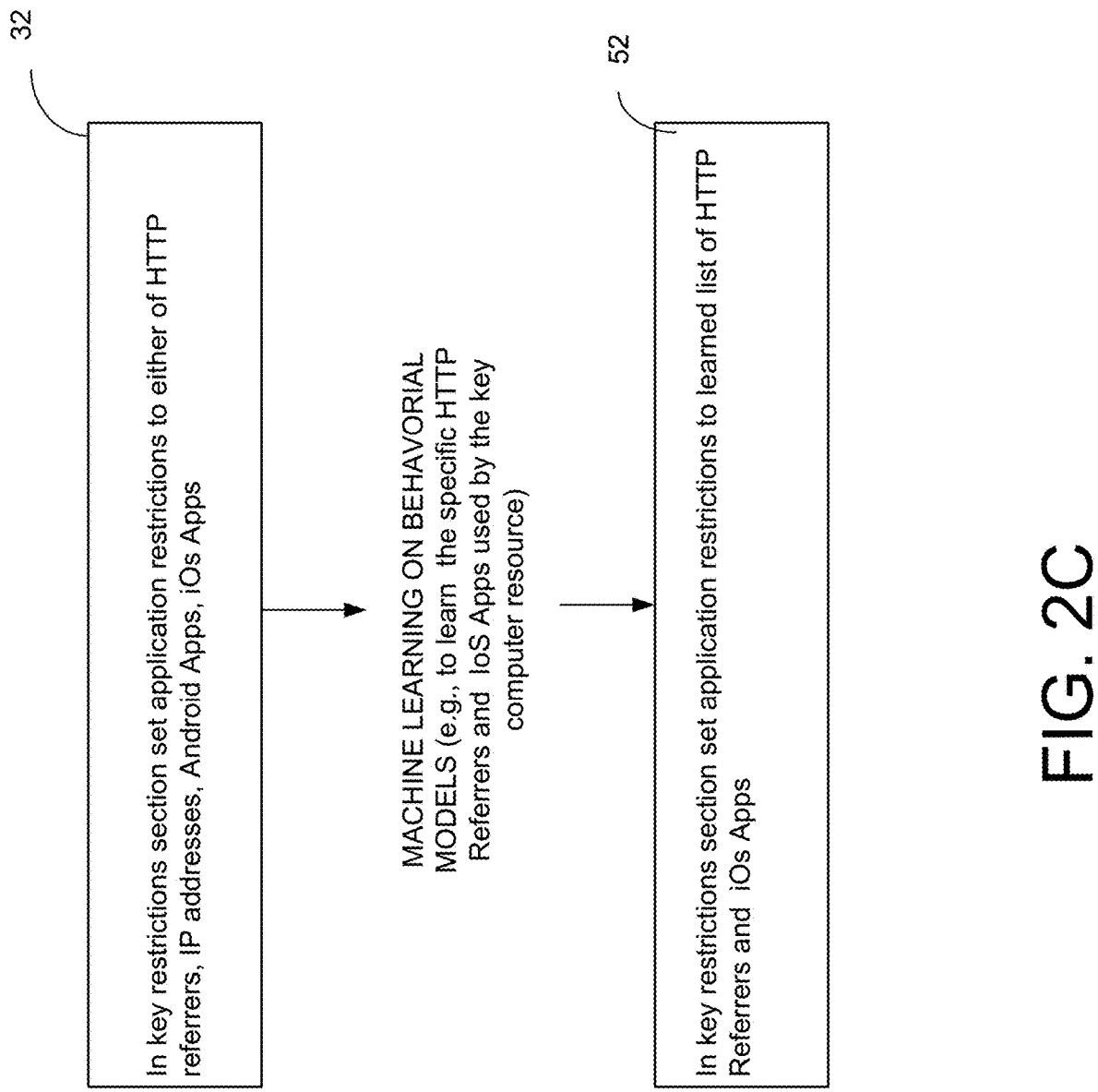
FIG. 2C is a schematic illustration of a remediation action being developed into a safe remediation action by machine learning on the behavioral models, in accordance with the principles of the present disclosure.

Restricting permission for setting application restrictions on two Entities (i.e., IP addresses and Android Apps) listed in remediation action 32 may result in a safe remediation action (e.g., remediation action 52, FIG. 2C). Safe remediation action 52 may be based on a list of Entities (e.g., HTTP Referrers and iOs Apps) learned from the behavioral model. Safe remediation action 52 may, for example, be:

In key restrictions section set application restrictions to the learned list of HTTP Referrers and iOs Apps.

Safe remediation action 52 may permit setting application restrictions on only one of two Entities (i.e., (1) HTTP referrers, or (4) iOs Apps) without impacting application availability.

FIG. 2C schematically shows, for example, remediation action 32 (FIG. 2A) being converted by machine learning on the behavioral models into a safe remediation action 52. The machine learning on the behavioral models may be used, for example, to learn a list of specific entities (i.e., HTTP Referrers and iOs Apps) used by the key computer resource. Safe remediation action 52 may be based on the learned list of specific entities.

In FIG. 2C, for purposes of visual illustration, the two entities (i.e., IP addresses, Android Apps) that are removed from remediation action 32 (by machine learning) to arrive at remediation action 52 are shown in strikeout font.

Safe remediations (such as safe remediation action 52) may be stored in a data store (not shown). A safe remediation from the data store may be automatically suggested (e.g., to SecOps operators) as a safe fix to secure networked computer system 100 each time a security vulnerability in networked computer system 100 is detected or reported.

Figure 3:
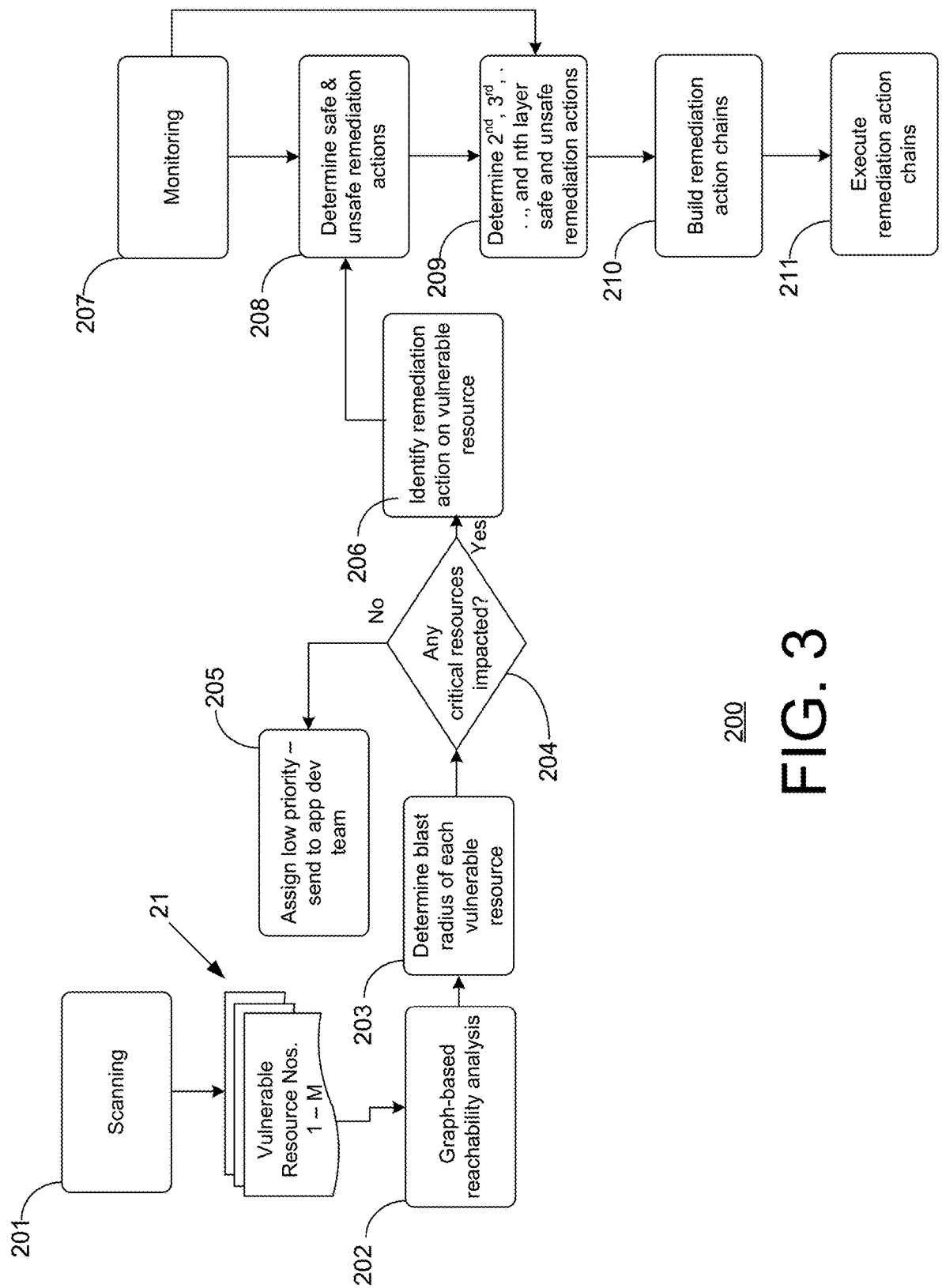
FIG. 3 is a schematic illustration of an example method for reachability graph-based safe remediation of a networked computer system, in accordance with the principles of the present disclosure.

FIG. 3 is a schematic illustration of an example method 200 for reachability graph-based safe remediation of a networked computer system, in accordance with the principles of the present disclosure.

Method 200 may include, at step 201, scanning the networked computer system (e.g., networked computer system 100) to identify one or more vulnerable computer resources (e.g., Vulnerable Resource Nos. 1-M 21). The scanning may be performed by commercially-available vulnerability detection and reporting systems (e.g., BMC Helix® Cloud Security solution, BMC® Automated Mainframe Intelligence™ (BMC AMI®) solutions, Oracle® Cloud Security, Palo Alto Network security, CloudGuard Dome 9 public cloud security, etc.) that can automatically scan, detect, and report security vulnerabilities. Any number of vulnerable computer resources 21 may be identified.

FIG. 3 shows, for example, M vulnerable computer resources 21 labeled as Vulnerable Resource Nos. 1-M. Further, method 200 may include conducting a graph-based reachability analysis (202) of networked computer system 100 showing paths to different computer resources in the networked computer system that are accessible from the vulnerable computer resources 21. Method 200 may include, based on the graph-based reachability analysis 202, determining a blast radius of each vulnerable computer resource (203) in the networked computer system. The vulnerable computer resources for which blast radii are determined may include the vulnerable computer resources (e.g., vulnerable computer resources 21) identified at step 201 or any other resources that may have been otherwise identified as being vulnerable.

After the blast radius of a vulnerable computer resource has been determined, method 200 may include determining if any critical computer resources are impacted (204) by the vulnerable computer resource. The critical computer resources may be computer resources that have been previously identified (e.g., by a customer or an administrator) as being critical computer resources. The customer or administrator may, for example, identify one or more buckets, databases, and servers as critical resources. A critical resource may be considered to be impacted if it is within the blast radius of the vulnerable computer resource.

If no critical computer resources are impacted (i.e., no critical computer resources are within the blast radius of the vulnerable computer resource), method 200 may include assigning a low priority (205) to the remediation of the vulnerable computer resource. The vulnerable computer resource that has been assigned a low priority may, for example, be referred to a SecOps application team for non-urgent remediation on the SecOps application team's schedule.

If one or more critical computer resources are impacted (i.e., the one or more critical computer resources are within the blast radius of the vulnerable computer resource), method 200 may include identifying a remediation action on the vulnerable computer resource (206). The remediation action on the vulnerable computer resource may, for example, be a point fix of the vulnerable computer resource (in the layer of the networked computer system to which the vulnerable computer resource belongs). The remediation action may be an industry standard remediation action available, for example, from CIS.

Further, method 200 may include monitoring (207) the behavior of the networked computer system to determine interactions between computer resources (that are used, for example, by an application). The monitoring may, for example, include monitoring traffic flows (data exchanges) between the computer resources over a period of time (e.g., the past 90 days) using commercially-available monitoring solutions (e.g., Amazon Virtual Private Cloud flow logs (which capture information about Internet Protocol traffic to and from network interfaces in a Virtual Private Cloud (VPC)), AWS CloudTrail logs (which publishes VPC flow log data), and AWS Config (which allows the assessment, audit, and evaluation of configurations of Amazon Web Services resources, etc.).

Based on the monitored behavior of the networked computer system, method 200 may include determining whether the remediation action (identified at 206) on the vulnerable computer resource is a safe remediation (i.e., a remediation that does not impact application availability) or an unsafe remediation (i.e., a remediation that impacts application availability) (208).

In an example implementation, method 200 may further include (in conjunction with the monitoring at 207) determining safe and unsafe remediation actions (209) for computer resources that may be in one or more higher layers (e.g., a second layer, a third layer, . . . an nth layer) of the networked computer system.

Method 200 may, at 210, include building remediation action chains (i.e., a series of one or more remediation actions) including the previously determined safe remediation actions (e.g., first layer remediation at 208, and second, third, and nth layer remediations at 209) for each of computer resources 21 that have security vulnerabilities. A remediation action chain that includes safe remediation actions at multiple layers may provide a defense-in-depth security remediation for the networked computer system.

Method 200 further includes executing or implementing the remediation action chains (211). The remediation action chains may be executed automatically (e.g., by SecOps without a need for consulting with application teams), while preserving application availability on the networked computer system.

Further details of some of the different stages and steps of method 200 (e.g., step 201, step 202, step 203, step 204, step 206, step 207, step 208, and step 209) to secure a networked computer system are discussed below with reference to securing, for example, networked computer system 100 (FIG. 1B).

Step 201 of Method 200: Scanning

As shown in FIG. 1B, networked computer system 100 includes two vulnerable computer resources (i.e., application server security group 101 with an open port 22, and object storage service 106 (e.g., an Amazon Simple Storage Service (S3) bucket) with public access. Scanning networked computer system 100, at step 201 of method 200, would identify the foregoing two resources (i.e., application server security group 101 and object storage service 106 (e.g., an Amazon Simple Storage Service (S3) bucket)) as being computer resources that are vulnerable to external attack.

Step 202 of Method 200: Graph-Based Reachability Analysis

The graph-based reachability analysis may include determining links between different computer resources beginning, for example, with a vulnerable computer resource. FIG. 1B shows, for example, a reachability graph depicting links between the different computer resources beginning with the vulnerable computer resource (e.g., application server security group 101) in layer 1 of networked computer system 100.

Figure 4:
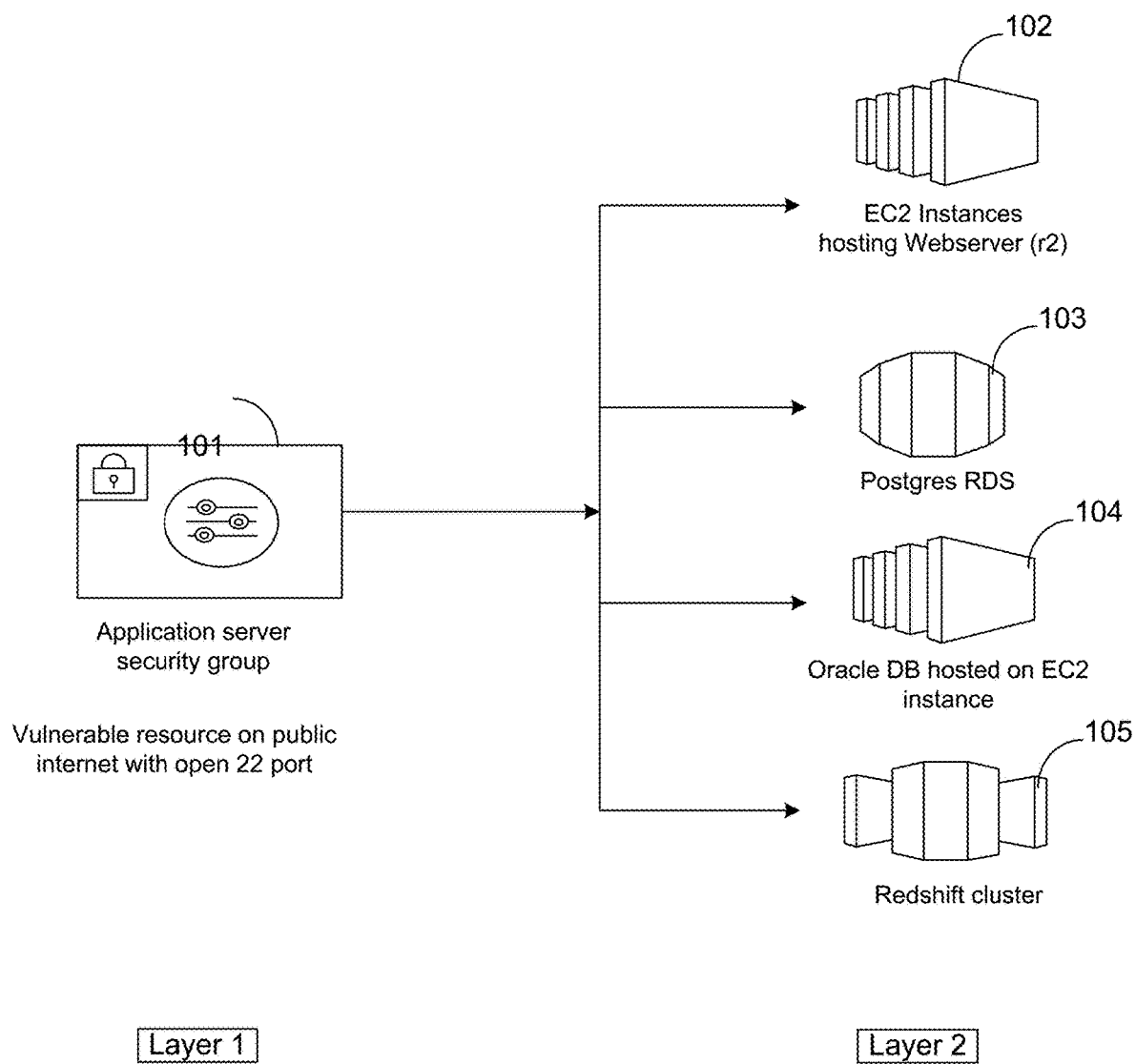
FIG. 4 illustrates a set of computer resources in the networked computer system of FIG. 1B that are within a blast radius of a vulnerable computer resource, in accordance with the principles of the present disclosure.

Step 203 of Method 200: Determining the Blast Radius of Each Vulnerable Computer Resource Determination of the blast radius of a vulnerable computer resource (e.g., application server security group 101, FIG. 1B) may involve identifying which network interfaces are directly (or indirectly) attached to the vulnerable computer resource. Identification of the interfaces attached to the vulnerable computer resource can lead to a determination of what services or resources in the networked computer system access, or can be accessed from, the vulnerable computer resource. The blast radius of the vulnerable computer resource may be determined to extend over the set of all services or resources that can access, or can be accessed from, the vulnerable computer resource. For example, as shown in FIG. 1B, the vulnerable computer resource-application server security group 101, is attached to four computer resources (i.e., virtual servers 102 (e.g., Amazon's Elastic Compute Cloud (EC2), one or more relational databases 103 (e.g., an open source Postgres RDS relational database), a third-party database 104 (e.g., an Oracle database), and a data warehouse 105 (e.g., an Amazon Redshift cluster)) in layer 2 of networked computer system 100. Thus, the blast radius of application server security group 101 may be determined by method 200 to extend over, or include, at least the foregoing set of four computer resources to which application server security group 101 is attached. FIG. 4 illustrates the set of four computer resources in layer 2 of networked computer system 100 that are within the blast radius of application server security group 101. The blast radius of application server security group 101 may extend to include computer resources in higher layers (e.g., layer 3, FIG. 5 and FIG. 6, and layers 3 to 6, FIG. 8) of networked computer system 100 via the foregoing four computer resources in layer 2.

Step 204 of Method 200: Determining Whether any Critical Computer Resources are Impacted by the Vulnerable Computer Resource Determining whether any critical computer resources are impacted by the vulnerable computer resource may involve determining if paths ("vulnerability paths") exist over which the critical computer resources can be reached from the vulnerable computer resource. The reachable critical computer resources may be within the blast radius of the vulnerable resource or may be indirectly accessible via another computer resource within the blast radius. Reachability analysis is used to determine which critical computer resources are reachable and are potentially impacted (i.e., rendered vulnerable over the vulnerability path from the vulnerable resource).

As an example of the reachability analysis consider, a resource-virtual server 102 (e.g., Amazon's Elastic Compute Cloud (EC2)), shown in FIG. 1B. Determining whether any critical computer resources can be impacted via virtual server 102 involves a check of what resources are accessed by virtual server 102, and to what resources virtual server 102 has permission access. In example implementations, AWS Identity and Access Management (IAM) roles (which control individual and group access to a computer system resource), and a description of the resource configuration, may be used to discover the computer resources accessed by, and the permission access of, virtual server 102.

In the example networked computer system 100 shown in FIG. 1B, consideration of the IAM roles assigned to virtual server 102 may discover that four resources (i.e., object storage service 106 (e.g., an Amazon Simple Storage Service (S3) bucket), protected ES domain 107, elastic cache 108, and a messaging queue service 109 (e.g., an Amazon SQS Queue URL)) in layer 3 can be accessed by virtual server 102. Further, consideration of the description of resource configuration may discover that virtual server 102 has permission access to EBS volumes 110 and elastic IPs 111 in layer 3.

The reachability analysis further involves scanning all of the discovered resources to determine if there is any vulnerability path to a critical computer resource from the vulnerable computer resource. In the example networked computer system 100 shown in FIG. 1B, the scanning may reveal the existence of a vulnerability path to a critical computer resource (i.e., object storage service 106 (e.g., an Amazon Simple Storage Service (S3) bucket), which has public access) from the vulnerable computer resource (application server security group 101) via virtual server 102.

Figure 5:
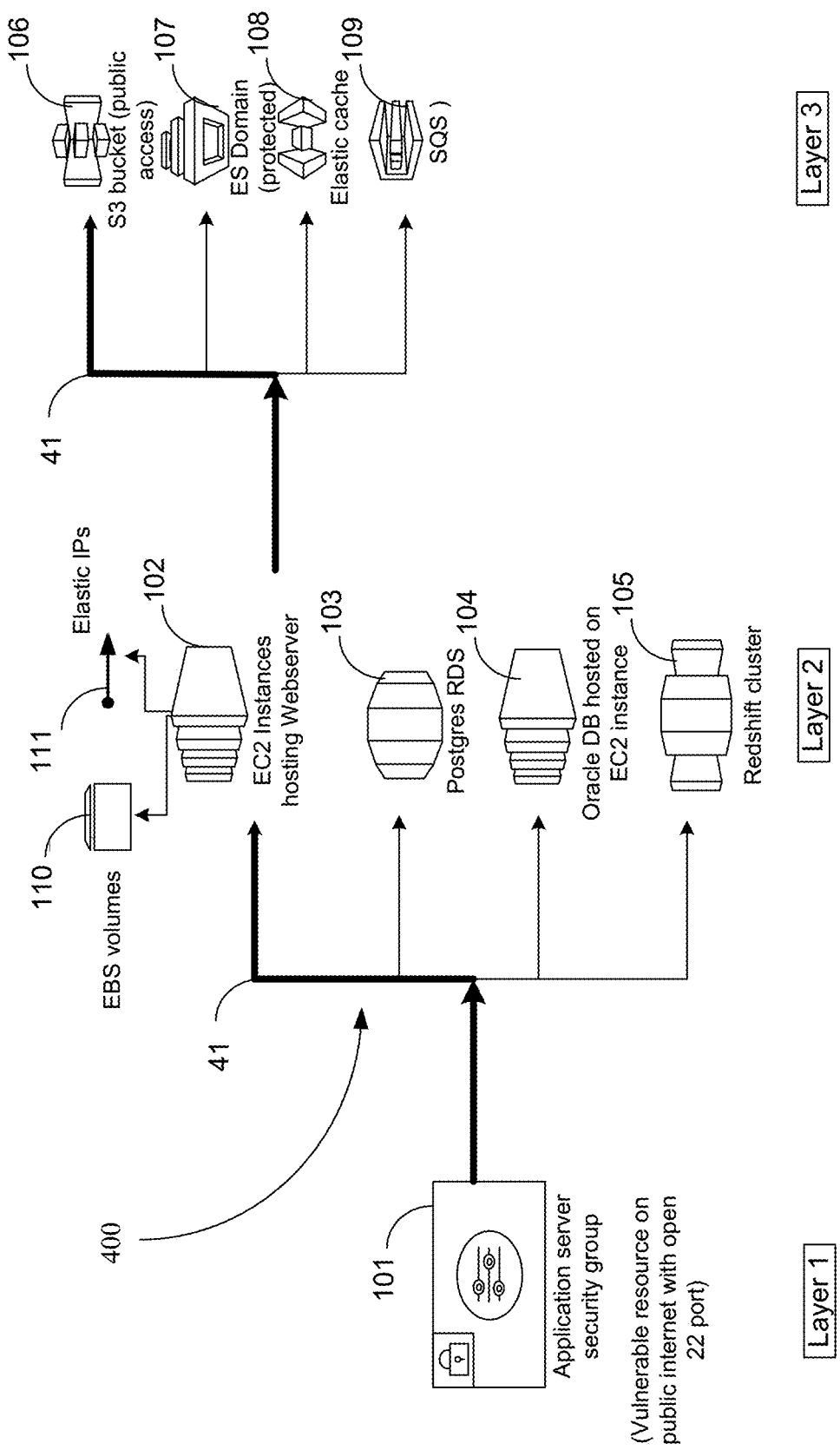
FIG. 5 illustrates a graph of a vulnerability path from a vulnerable computer resource to other computer resources through three layers of computer resources in the networked computer system of FIG. 1B, in accordance with the principles of the present disclosure.

On the basis of the analysis, a reachability graph from public vulnerabilities to critical computer resources in networked computer system 100 may be plotted. FIG. 5 shows an example reachability graph 400 depicting vulnerability path 41 (in bold line) extending from a publicly vulnerable computer resource (i.e. application server security group 101) to a critical business resource (i.e., object storage service 106 (e.g., an Amazon Simple Storage Service (S3) bucket)) via virtual server 102.

Figure 6:
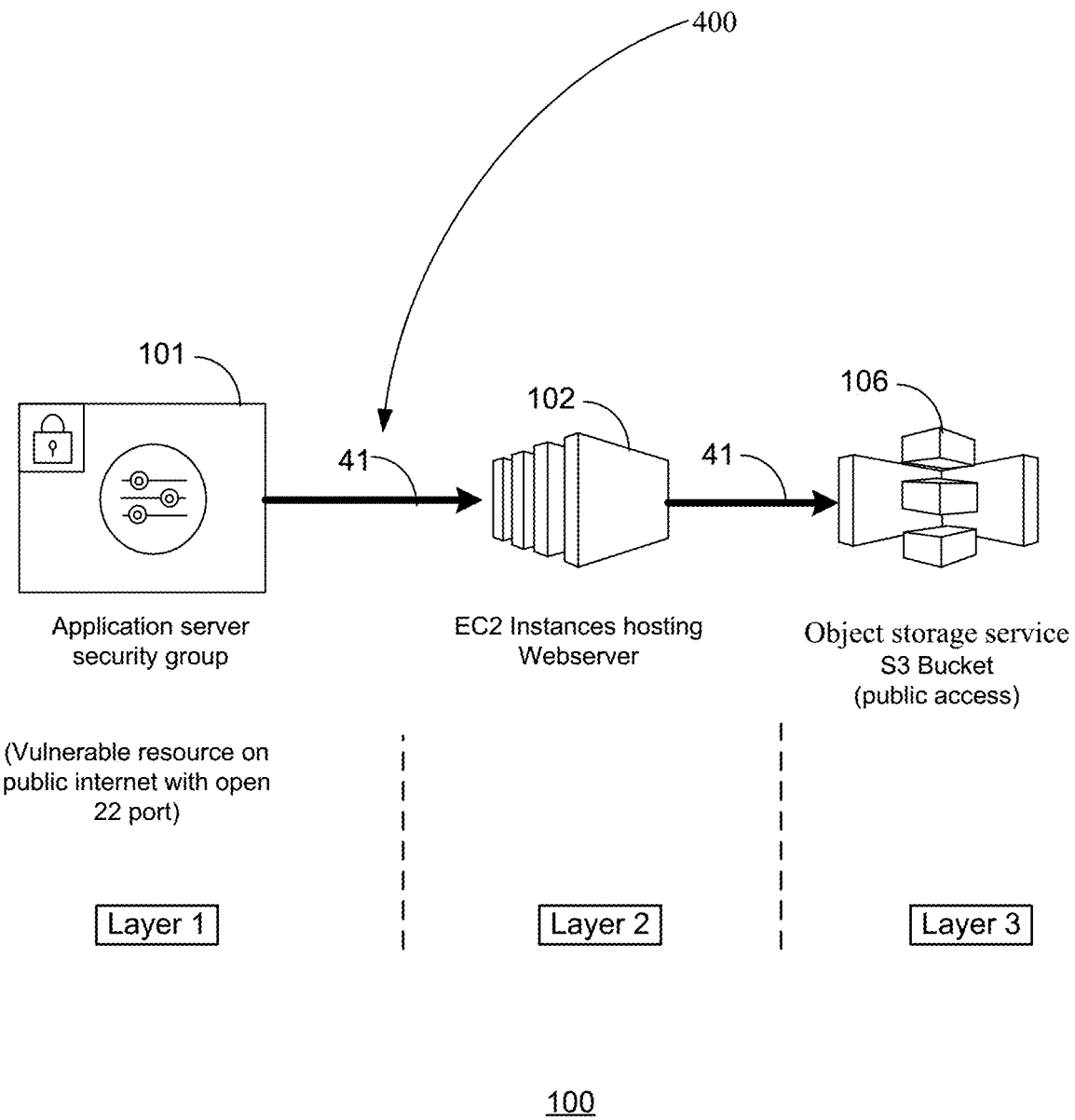
FIG. 6 illustrates, for visual clarity, only the specific computer resources along a graph of the vulnerability path of FIG. 5 that need to be considered for determining safe remediation action on the vulnerable computer resource, in accordance with the principles of the present disclosure.

FIG. 6 shows, for visual clarity, only the specific computer resources (i.e., application server security group 101, virtual server 102, and object storage service 106) along reachability graph 41 (in the example of FIG. 5) that need to be considered for determining safe remediation action on the vulnerable computer resource (i.e., application server security group 101).

Step 206 of Method 200: Identify Remediation Action on Vulnerable Resource

Standard remediation actions may be available from industry standards organizations (e.g., CIS). The standard remediation actions can be in one of several categories (e.g., Network, Compute, Storage, Logging, Monitoring, Access, Application, and Database). TABLE A (below) lists three example standard remediation actions (e.g., "Close S3 bucket," "Close port X", Config DB to Secure Sockets Layer (SSL) only") and meta data related to the three example remediation actions.

TABLE A

| Remediation Action | Safe Condition | Behavioral Model Metrics | Compensation Available (yes\|no) | Compensation Method |
|---|---|---|---|---|
| Close S3 bucket | #ofcalls=0 | Resource_to_resource. #ofcalls | Yes | IAM policy API/CLI |
| Close port X | #ofcalls=0 | Resource_to_IP.#ofcalls | Yes | IAM policy API/CLI |
| Config DB to SSL only | #ssl=true | Resource_to_resource.ssl | No | . . . |

As shown in TABLE A, meta data for each remediation action may include a "Safe Condition" criterion that is expressed in terms of values of "Behavioral Model Metrics" associated within each category of the remedial action, an indication of whether there is "Compensation Available" for exceptions, and a "Compensation Method", if available for the exceptions. An example Compensation Method (e.g., for the remediation action "Close port X") may be "add IP ingress rule method".

Each remediation action can be implemented as a command line instruction (CLI), application programming interface (API), or a script with parameters. As a rule, the safe condition must hold true if the remediation action is not to hinder or break any application functionality. If the rule cannot be satisfied, then a next step can be to specify compensation methods (if available) to the safe condition so that the remedial action can still be taken without breaking application functionality.

Step 207 of Method 200: Monitoring

In example implementations of method 200, monitoring 207 may, for example, include monitoring traffic flows (data exchanges) along the paths between the computer resources over a period of time (e.g., the past 30 days, the past 90 days, etc.) using commercially available monitoring solutions (e.g., Amazon Virtual Private Cloud flow logs (which capture information about Internet Protocol traffic to and from network interfaces in a Virtual Private Cloud (VPC)), AWS CloudTrail logs (which publishes VPC flow log data), and AWS Config (allows the assessment, audit, and evaluation of configurations of Amazon Web Services resources, etc.).

The monitoring solutions may identify paths in the networked computer system that have measurable traffic flows over a time period (e.g., the past 90 days), and thus are paths that are important for preserving application availability. Because traffic was exchanged on these paths, it is likely that the application would need to use them again. For safe remediation, these paths should not be completely blocked by any remediation action.

Other paths in the networked computer system (e.g., paths that have little or no traffic flow (over the past time period) may be trimmed, removed, or shutdown without affecting application availability. These other paths can be remediated using traditional approaches without a high risk of affecting application availability.

Monitoring 207 may include collecting tracking logs and event logs in different domains (e.g., Network, Access, Storage, Application, and Database domains) of networked computer system 100: In an example implementation, a flow log may be collected in the Network domain, application programming interface (API) logs may be collected in the Access and Application domains, database logs may be collected in the Database domain, and application logs and configuration history may be collected in the Application domain.

Specific behavioral models that track the behavioral metrics (e.g. Behavioral Model Metrics, TABLE A) may be derived from the monitored data that is specific to each domain. The behavioral models may be created from the data based on an observation period, for example, of few days to a month. FIG. 7 shows example behavioral models (i.e., MATRIX 501, MATRIX 502, and MATRIX 503) for the behavioral metrics (i.e., Resource_to_resource-#ofcalls, Resource_to_IP-#ofcalls, and Resource_to_API-#ofcalls) listed in TABLE A.

Step 208 of Method 200: Determining Whether a Remediation Action is a Safe Remediation or an Unsafe Remediation Determining whether a remediation action is a safe remediation or an unsafe remediation is directed to determining application availability upon implementation of the remediation action to secure the vulnerable computer resource. The determination of whether the remediation action is a safe remediation, or an unsafe remediation, may be based on behavioral data collected by monitoring the operation of the computer resources along high-risk paths (e.g., vulnerability path 41) in the networked computer system.

Safe remediation actions may be created based on the behavior of computer resources along high-risk paths (e.g., vulnerability path 41) in the networked computer system. A safe remediation action may include closing general open access over the vulnerability path to a critical computer resource and, instead, include providing specific access to the critical computer resource to only a selected computer resource used in proper execution of the application.

Data on traffic flows to, and from, the vulnerable computer resources (e.g., over vulnerability path 41) may be used to identify networked computer system resources (e.g., virtual server 102) that access the vulnerable computer resources (e.g., application server security group 101, and object storage service 106 (e.g., an Amazon Simple Storage Service (S3) bucket)) for proper purposes (i.e., proper execution of the application). Safe remediation actions may be created by providing specific access to only the identified resources that access the vulnerable computer resources for proper purposes while removing open access over the high-risk paths as part of the remediation.

TABLE B below shows examples of unsafe remediation actions and safe remediation actions for a networked computer system based on behavior monitoring data (collected, for example, over 30 days). The safe remediation actions may be obtained by adding compensatory or additional methods to the unsafe remediation actions. The examples in the table are for networked computer system 100 (FIG. 1B) having two vulnerable computer resources (i.e., application server security group 101 with an open port 22, and object storage service 106 (e.g., an Amazon Simple Storage Service (S3) bucket) with public access).

TABLE B

| Resource Application | Unsafe Remediation Action (Traditional) Close open | Behavior Monitoring Data (e.g., over 30 days) Application server | Safe Remediation Action Close open port 22 |
| --- | --- | --- | --- |
| server security group 101 | port 22 | security group 101 -> virtual server 102 | open application server security group 101 -> virtual server 102 IP |
| | | Source (e.g., IP address XX) accessing application server security group 101 on port 22 | Open IP address XX for port 22 |
| Object storage service 106 (S3 bucket) | Close public access | Virtual server 102 -> object storage service 106 (S3 bucket); User (e.g., user YY) accessing object storage service 106 (S3 bucket) | Close public access Provide virtual server 102 access to object storage service 106 (S3 bucket) using IAM permission policies Give access to user YY for object storage service 106 (S3 bucket) |

As shown in TABLE B, the behavior monitoring data shows that application server security group 101 is attached to virtual server 102, and that a source (an example application) at IP address XX is accessing application server security group 101 on port 22. A traditional remediation action to secure application server security group 101 is to delete open port 22. However, this traditional remediation action would deny access to the source (the example application) at IP address XX and affect application availability. TABLE B shows an example safe remediation action that could secure application server security group 101 while preserving application availability. The safe remediation action chain includes an action that closes open port 22 on application server security group 101, and a compensatory action that provides specific access to source (the example application) at IP address XX by additionally attaching open application server security group 101 to virtual server 102 IP addresses and opening source IP address XX for port 22.

TABLE B also shows that virtual server 102 is attached to object storage service 106 (S3 bucket), which has public access, and that a user "YY" (an example application) is accessing object storage service 106 (S3 bucket). A traditional remediation action to secure object storage service 106 (S3 bucket) is to close its public access. However, this traditional remediation action would deny access to user YY (the example application) and affect application availability. TABLE B shows a safe remediation action that could secure object storage service 106 (S3 bucket), while preserving application availability. The safe remediation action chain includes an action closing public access to object storage service 106 (S3 bucket), and a compensatory action that provides specific access to source user YY by providing virtual server 102 access to object storage service 106 (S3 bucket) using IAM permission policies and giving access to user YY for object storage service 106 (S3 bucket).

In example implementations, the determination of whether the remediation action is a safe remediation, or an unsafe remediation may be based on evaluating the safe condition (TABLE A) of the remediation action with reference to the behavioral models (e.g., MATRIX 501, MATRIX 502, and MATRIX 503, FIG. 7) for the behavioral metrics (e.g., Resource_to_resource-#ofcalls, Resource_to_IP-#ofcalls, and Resource_to_API-#ofcalls, TABLE A). The behavioral models may be evaluated to determine if the safe condition of the remedial action is violated. If the safe condition of the remedial action is violated, an attempt can be made to include a compensatory action (e.g., when compensation methods (TABLE A) for the remedial action) are available). When one or more compensatory actions cannot be achieved, then the remediation action is determined to be an unsafe remediation.

The following is a snippet of pseudocode that may be used for automating the determination of whether the remediation action is a safe remediation, or an unsafe remediation.

CompensationList=[ ]//empty list of compensations
CompensationNotAvailable=False
Action is the action being analyzed
SafeCondition=Action.SafeCondition   //expression to evaluate
Model [i,j] is the value in each cell of the matrix for ith row and jth column
For each model(i,j), evaluate SafeCondition
If SafeCondition for all interactions of the resource is true
   Recommend=>
   Safe remediation
   (e.g. #ofcalls is applied to each resource —IP interaction to determine if it violates condition or not)
Else
   Identify cells (i, j) in the behavioral model that cause safe condition to be violated
   If CompensationAvailable is true
      Formulate a Compensation Action from this entry
      Add it to the compensation list
   Else
      CompensationNotAvailable=True
If CompensationNotAvailable is True
   Recommend=>"Unsafe remediation"
Else
   Recommend=>Safe remediation with compensations from CompensationList Step 209 of Method 200: Determining Safe and Unsafe Remediation Actions for One or More Higher Layers of the Networked Computer System The foregoing reachability graph-based analysis can be extended to any number of layers (e.g., 2 to N layers) of the networked computer system to find additional safe remediation actions for computer resources in the multiple layers to obtain a defense-in-depth for the networked computer system.

Figure 8:
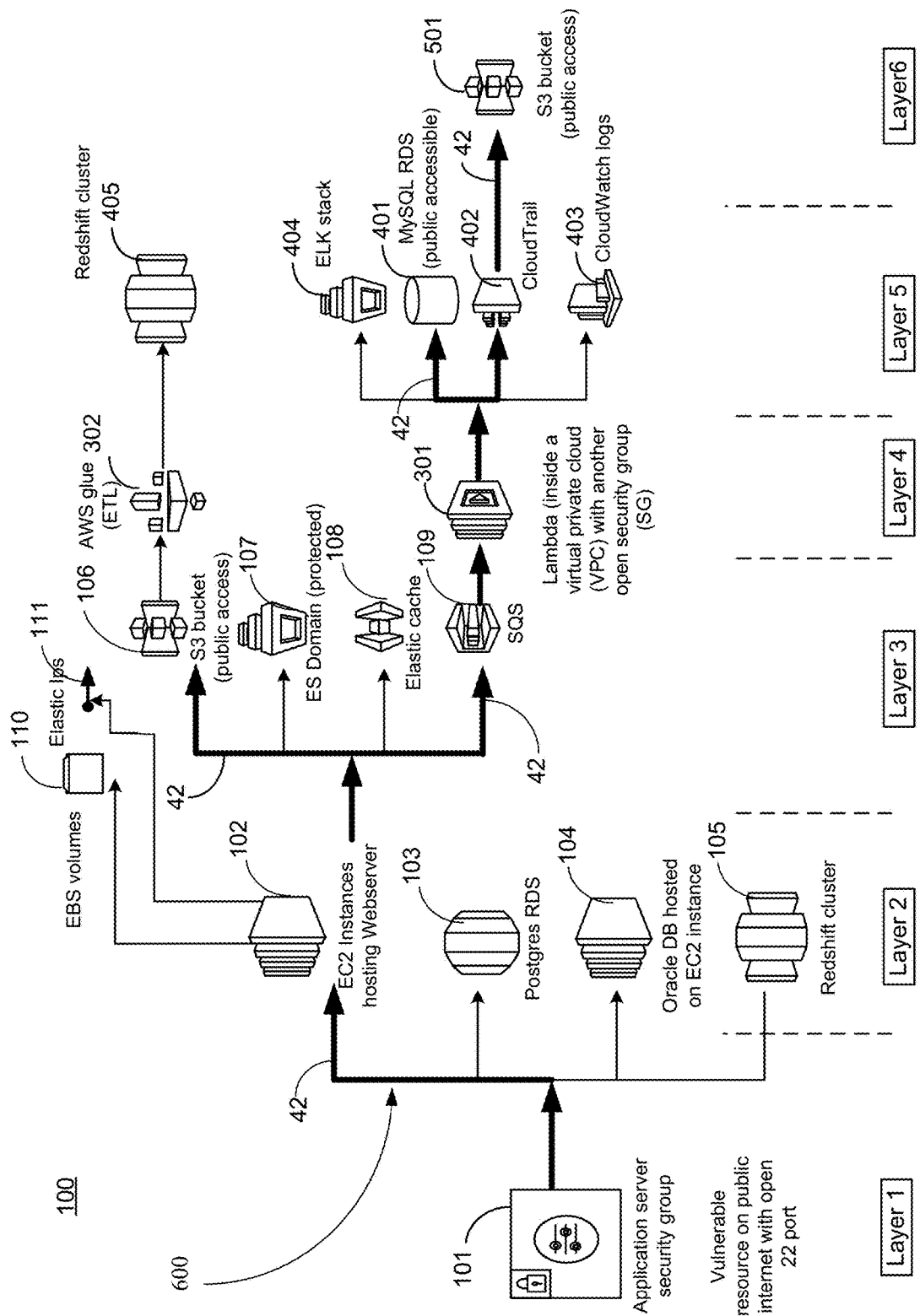
FIG. 8 illustrates a graph of a vulnerability path from a vulnerable computer resource to other computer resources through six layers of computer resources in the networked computer system of FIG. 1B, in accordance with the principles of the present disclosure.

FIG. 8 shows an example reachability graph 600 depicting vulnerability path 42 (in bold line) extending through virtual server 102 in layer 2 from a publicly vulnerable computer resource (i.e. application server security group 101) in layer 1 to a critical business resource (i.e., object storage service 106 (e.g., an Amazon Simple Storage Service (S3) bucket)) in layer 3; a critical business resource 301 (e.g., a Lambda Function to Access Resources in an Amazon VPC) in layer 4; a critical business resource 401 (e.g., a publicly accessible MySQL relational database service) in layer 5; and a critical business resource 501 (e.g., a S3 bucket with public access) in layer 6.

Safe remediation actions may be created based on the behavior of computer resources along the high-risk paths (e.g., vulnerability path 42) in the networked computer system extending across layer 1 to layer 6. The safe remediation actions can be implemented in layer 1 to layer 6 as a multi-layer defense without affecting application availability on the networked computer system.

As another example of the use of method 200 (e.g., steps 206-208) for determining whether a remediation action is a safe remediation or an unsafe remediation, consider a case of two vulnerable databases (e.g., database DB1 and database DB2) in a networked computer system that need remediation to ensure that these databases only accept Secure Sockets Layer (SSL) connections from other resources. An example traditional remediation action for this purpose may be a database reconfiguration action: Config DB to SSL only (shown in TABLE A).

FIG. 9 shows a behavioral model (e.g., MATRIX 901) that may be based on monitoring traffic flows (e.g., for the last 30 days) between the two databases (e.g., database DB1 and database DB2) and other computer resources (e.g., Resource-239, Webserver-5, Web-1 and IP-2, etc.) in the networked computer system. MATRIX 901 may show that DB1 already has all incoming connections (e.g., from Resource-239, Webserver-5, Web-1 and IP-2, etc.) that are SSL encrypted, while DB2 has a mixed model (with a DB2-Resource-239 connection not being an encrypted SSL connection). Based on MATRIX 901, the remediation analytics at step 208 of method 200 may flag a "safe remediation" on DB1 but call out an unsafe remediation on DB2.

The meta data (e.g., TABLE A) for the remediation action—Config DB to SSL only, may include only the following data:

Operational Model: Resource_to_resource.ssl-y if always ssl or else false (n);
Safe Condition: ssl=y;
CompensationAvailable=no; and
Compensation method=no.

The remediation action—Config DB to SSL, will remain an unsafe remediation on DB2 because no compensation action is available to modify the unsafe application breaking characteristics of the remediation.

Figure 10:
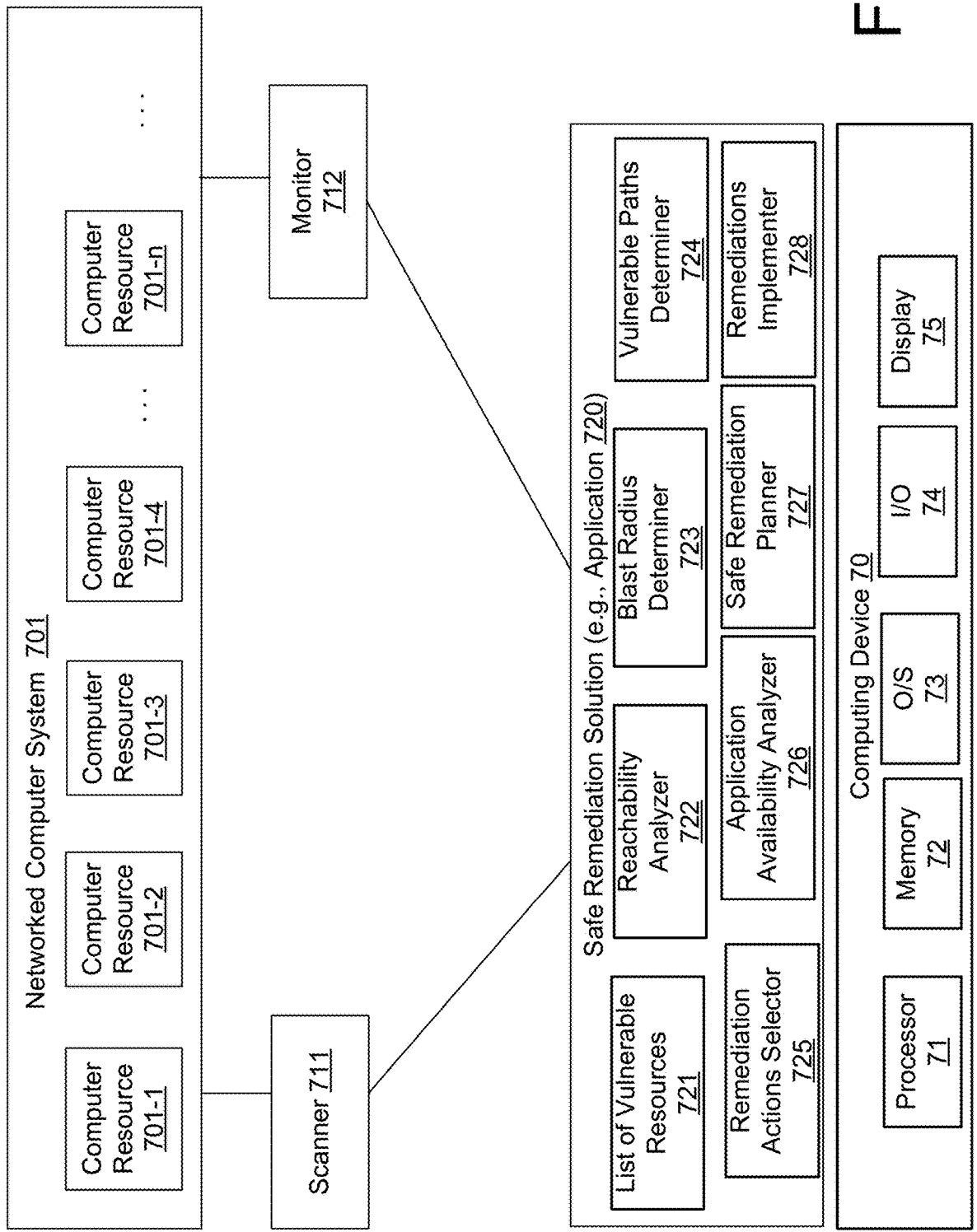
FIG. 10 is a block diagram illustration of an example system for securing a networked computer system while preserving an application's availability on the networked computer system, in accordance with the principles of the present disclosure.

FIG. 10 is a block diagram of an example system 700 for securing a networked computer system (e.g., networked computer system 701) while preserving application availability on the networked computer system, in accordance with the principles of the present disclosure.

Networked computer system 701 may, like networked computer system 100, include a plurality of linked computer resources (computer resource 701-1, computer resource 701-2, computer resource 701-3, computer resource 701-4, . . . computer resource 701-n, etc.) arranged in one or more layers (not shown). The computer resources may include a variety of hardware, software, and firmware components for supporting execution of an application on the networked computer system. One or more of the computer resources may be identified as being critical computer resources (e.g., by customers or administrators) as containing sensitive data or information that should be kept private.

System 700 includes a safe remediation solution (e.g., application 720) coupled to networked computer system 701, one or more vulnerability and threat detection tools (e.g., scanner 711, etc.), and one or more network monitoring tools (e.g., monitor 712, etc.). Scanner 711 may identify computer resources in networked computer system 701 that have security vulnerabilities and are susceptible to attack. Monitoring tool 712 may monitor traffic flows between the different computer resources in networked computer system 701, for example, while the application is being executed on networked computer system 701.

In system 700, safe remediation of networked computer system 710 may be carried out via application 720, which may, for example, be hosted on one or more physical or virtual computers (e.g., a computing device 70 that, for example, includes a processor 71, a memory 72, an O/S 73, an input/output port (I/O) 74 and a display 75) coupled to networked computer system 701.

In example implementations, application 720 may be configured to receive reports of computer resource vulnerabilities that are identified, for example, by scanner 711, as being present in networked computer system 701. Application 720 may be configured to receive data on the behavior of the computer resources in networked computer system 701 that may be collected, for example, by monitor 712 over a time period (e.g., 30 days, 90 days, etc.). The behavior data may, for example, include data on traffic flows between the computer resources.

Application 720 (e.g., hosted on computing device 70) may include one or more modules (e.g., a list of vulnerable resources 721, a reachability analyzer 722, a blast radius determiner 723, a vulnerability paths determiner 724, a remediation actions selector 725, an application availability analyzer 726, a safe remediation planner 727, and a remediation implementer 728) to secure networked computer system 701.

The functions and operations of the one or more modules 721-728 may be configured, for example, to implement the steps of a method (e.g., steps 201-211 of method 200, FIG. 3) for prioritizing safe remediation of the vulnerabilities in networked computer system 701.

Application 720 may generate safe remediation action chains to secure vulnerable computer resources along vulnerability paths in the networked computer system and to protect and safeguard critical computer resources that contain sensitive or highly private data. The vulnerable computer resources or critical computer resources may exist in different layers of the computer resources in the networked computer system. The safe remediation action chains may include a series of one or more point remediation fixes for the vulnerable computer resources in the different layers and provide a multi-layer defense-in-depth for the networked computer system.

For purposes of generating safe remediation action chains, application 720 may consider "vulnerabilities" to include software vulnerabilities (i.e., vulnerabilities that can be remedied by code patches), system configuration vulnerabilities (i.e., vulnerabilities that can be remedied by system reconfigurations, such as server hardening, closing of network ports, etc.), and security policy violation vulnerabilities (i.e., vulnerabilities that can be remedied by policy remediation).

In example implementations, list of vulnerable resources 721 in application 720 may be a list of computer resources that have been identified as having vulnerabilities (e.g., by scanner 711). Reachability analyzer 722 may be configured to prepare a reachability graph showing links between the different computer resources (including the vulnerable computer resources) in the networked computer system. Blast radius determiner 723 may be configured to determine a blast radius for each vulnerable computer resource. Vulnerability paths determiner 724 may be configured to identify possible attack paths (i.e., vulnerability paths) extending from the vulnerable computer resource to one or more critical computer resources. Remediation actions selector 725 may be configured to identify and select one or more possible remediation actions to remediate the computer resource vulnerabilities. Application availability analyzer 726 may be configured to determine whether a selected remediation action is a safe remediation action (i.e., a remediation having little or no impact on application availability) for the networked computer system. Safe remediation planner 727 may be configured to generate a safe remediation action chain (i.e., a series of one or more remediation actions) that can secure vulnerable computer resources and critical computer resources along a vulnerability path in the networked computer system. Remediations implementer 728 may be configured to automatically implement the safe remediation action chain (e.g., in conjunction with computer resource configuration tools (not shown)) to secure vulnerable computer resources and critical computer resources along a vulnerability path in the networked computer system.

FIG. 11 shows an example method 800 for securing a networked computer system that may be implemented using system 700, in accordance with the principles of the present disclosure. The networked computer system may provide a computing platform on which applications are executed.

Method 800 includes identifying a vulnerable computer resource in the networked computer system (801) and identifying a remediation action (802). The method further includes determining whether the remediation action is a safe remediation action that does not reduce availability of the application on the networked computer system or an unsafe remediation action that reduces availability of the application on the networked computer system (803), and implementing the remediation action if it is the safe remediation action to secure the networked computer system (804).

Method 800 further includes prioritizing implementation of the remediation action to secure the vulnerable computer resource if a vulnerability path extends from the vulnerable computer resource to a critical computer resource that is used by an application. The safe remediation action may include closing open access to the critical computer resource over the vulnerability path to all users and providing specific access to the critical computer resource over the vulnerability path to only a selected computer resource used in proper execution of the application.

In method 800, determining if the remediation action is a safe remediation action or an unsafe remediation action includes determining what computer resources in the networked computer system are accessible from, or are accessed by, the vulnerable computer resource. Determining what computer resources in the networked computer system are accessible from, or are accessed by, the vulnerable computer resource includes monitoring traffic flows between the computer resources over a period of time to identify vulnerability paths from the vulnerable computer resource to other computer resources in the networked computer system, and determining whether the vulnerability paths lead to a critical computer resource used in execution of the application.

If the remediation action is determined to be an unsafe remediation action, method 800 may involve converting the remediation action into the safe remediation action, wherein the safe remediation action includes closing open access to the critical computer resource over the vulnerability path to all users and providing specific access to the critical computer resource to the application.

Method 800 may include determining a blast radius of the vulnerable computer resource by determining what computer resources are directly or indirectly attached to the vulnerable computer resource. Determining what computer resources in the networked computer system are accessible from, or are accessed by, the vulnerable computer resource can include considering AWS Identity and Access Management (IAM) roles assigned to a computer resource to discover other computer resources that can be accessed from the computer resource, and considering a description of the computer resource's configuration to discover the computer resource's permission access to other computer resources.

Method 800 may further include monitoring computer resource behavior in the networked computer system over a period of time to check traffic flows between the computer resources in the networked computer system and using the traffic flows to assess an impact of the vulnerability path on application availability. The safe remediation action can include removing general open access to the vulnerable computer resource for all users, and, instead, include providing specific access only to a computer resource that has exhibited past traffic flows over the vulnerability path to the critical computer resource.

Implementations of the various techniques and systems described herein may be implemented in digital electronic circuitry, or in computer hardware, firmware, software, or in combinations of them. Implementations may be implemented as a computer program product, i.e., a computer program tangibly embodied in a non-transitory information carrier, e.g., in a machine-readable storage device (computer-readable medium) for processing by, or to control the operation of, data processing apparatuses, e.g., programmable processors or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communications network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the processing of a computer program include, by way of example, both general and special purpose microprocessors, and any one or more processors of any kind of digital computer. Generally, a processor will receive instructions and data from a read-only memory or a random-access memory or both. Elements of a computer may include at least one processor for executing instructions and one or more memory devices for storing instructions and data. Generally, a computer also may include, or be operatively coupled to receive data from or transfer data to, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal or plasma display monitors, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a networked computer system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communications network. Examples of communications networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that the described implementations have been presented by way of example only, not limitation, and various changes in form and details may be made. Any portion of the apparatuses and/or methods described herein may be combined in any combination, except mutually exclusive combinations. The implementations described herein can include various combinations and/or sub-combinations of the functions, components and/or features of the different implementations described.

What is claimed is:

1. A method for securing a networked computer system hosting an application, the method comprising:
   identifying a vulnerable computer resource in the networked computer system;
   identifying a remediation action;
   determining whether the remediation action is a safe remediation action that does not reduce availability of the application on the networked computer system or an unsafe remediation action that reduces availability of the application on the networked computer system, including determining what computer resources in the networked computer system are accessible from, or are accessed by, the vulnerable computer resource, by considering roles and a configuration of the vulnerable computer resource to discover other computer resources that have permission access from the vulnerable computer resource; and
   implementing the remediation action in response to determining that it is the safe remediation action to secure the networked computer system.

2. The method of claim 1, wherein the remediation action includes at least closing access to the vulnerable computer resource for all users.

3. The method of claim 1, wherein determining what computer resources in the networked computer system are accessible from, or are accessed by, the vulnerable computer resource includes monitoring traffic flows between the computer resources over a period of time to identify vulnerability paths from the vulnerable computer resource to other computer resources in the networked computer system.

4. The method of claim 3, further comprising:
   determining whether the vulnerability paths lead to a critical computer resource used in execution of the application.

5. The method of claim 4, further comprising:
   if the remediation action is determined to be an unsafe remediation action, converting the remediation action into the safe remediation action, wherein the safe remediation action includes closing open access to the critical computer resource over the vulnerability path to all users.

6. The method of claim 4, further comprising if the remediation action is determined to be an unsafe remediation action, converting the remediation action into the safe remediation action, wherein the safe remediation action includes providing specific access to the critical computer resource to the application.

7. The method of claim 1, wherein determining what computer resources in the networked computer system are accessible from, or are accessed by, the vulnerable computer resource includes:
   determining a blast radius of the vulnerable computer resource by determining what computer resources are directly or indirectly attached to the vulnerable computer resource.

8. The method of claim 1, wherein the roles include Identity and Access Management (IAM) roles.

9. The method of claim 1, further comprising:
   monitoring behavior of computer resources of the networked computer system over a period of time;
   generating behavioral models of the computer resources;
   using the behavioral models as training data for machine learning to learn the safe remediation action for the networked computer system that does not impact application availability.

10. The method of claim 9, wherein the machine learning learns from the behavioral models which particular computer resources in the networked computer system are affected by the safe remediation action and learns what access controls or modifications to the particular computer resources are implemented by the safe remediation action.

11. A system for securing a networked computer system hosting an application, the system comprising:
   a computing device including at least one processor and at least one memory, the memory storing instructions which, when executed by the at least one processor, cause the computing device to identify a vulnerable computer resource in the networked computer system;
   identify a remediation action;
   determine whether the remediation action is a safe remediation action that does not reduce availability of the application on the networked computer system or an unsafe remediation action that reduces availability of the application on the networked computer system, including determining a blast radius of the vulnerable computer resource by determining computer resources that are directly or indirectly attached to the vulnerable computer resource, including considering roles and a configuration of the vulnerable computer resource to discover other computer resources that have permission access from the vulnerable computer resource; and
   implement the remediation action in response to determining that it is the safe remediation action to secure the networked computer system.

12. The system of claim 11, wherein the remediation action includes at least closing access to the vulnerable computer resource for all users.

13. The system of claim 11, wherein the instructions, when executed by the at least one processor, cause the computing device to:
determine what computer resources in the networked computer system are accessible from, or are accessed by, the vulnerable computer resource.

14. The system of claim 13, wherein the instructions, when executed by the at least one processor, cause the computing device to analyze traffic flows between the computer resources over a period of time to identify vulnerability paths from the vulnerable computer resource to the other computer resources in the networked computer system.

15. The system of claim 14, wherein the instructions, when executed by the at least one processor, cause the computing device to determine whether the vulnerability paths lead to a critical computer resource used in execution of the application.

16. The system of claim 15, wherein the instructions, when executed by the at least one processor, cause the computing device to:
convert, if the remediation action is determined to be an unsafe remediation action, the remediation action into the safe remediation action, wherein the safe remediation action includes closing open access to the critical computer resource over the vulnerability path to all users and providing specific access to the critical computer resource to the application.

17. The system of claim 11, wherein the roles include Identity and Access Management (IAM).

18. A computer program product including instructions recorded on a non-transitory computer-readable storage medium and configured to cause at least one processor to:
identify a vulnerable computer resource in a networked computer system;
identify a remediation action;
determine whether the remediation action is a safe remediation action that does not reduce availability of an application hosted on the networked computer system or an unsafe remediation action that reduces availability of the application hosted on the networked computer system, including determining a blast radius of the vulnerable computer resource by determining computer resources that are directly or indirectly attached to the vulnerable computer resource, including considering roles and a configuration of the vulnerable computer resource to discover other computer resources that have permission access from the vulnerable computer resource; and
implement the remediation action in response to determining that it is the safe remediation action to secure the networked computer system.

19. The computer program product of claim 18, wherein the remediation action includes at least closing access to the vulnerable computer resource for all users.

20. The computer program product of claim 18, wherein determining whether the remediation action is a safe remediation action or an unsafe remediation action includes determining what computer resources in the networked computer system are accessible from, or are accessed by, the vulnerable computer resource.

21. The computer program product of claim 20, wherein determining what computer resources in the networked computer system are accessible from, or are accessed by, the vulnerable computer resource includes monitoring traffic flows between the computer resources over a period of time to identify vulnerability paths from the vulnerable computer resource to other computer resources in the networked computer system.

22. The computer program product of claim 21, wherein identifying the vulnerability paths includes determining whether the vulnerability paths lead to a critical computer resource used in execution of the application.

23. The computer program product of claim 22 wherein the instructions, when executed, cause the at least one processor to:
if the remediation action is determined to be an unsafe remediation action, convert the remediation action into the safe remediation action, wherein the safe remediation action includes closing open access to the critical computer resource over the vulnerability path to all users and providing specific access to the critical computer resource to the application.

24. The computer program product of claim 18, wherein the roles include Identity and Access Management (IAM) roles.

* * * * *